C. Bartholomew.
Ditching Machine.
Nº 94,696.          Patented Sep. 14, 1869.
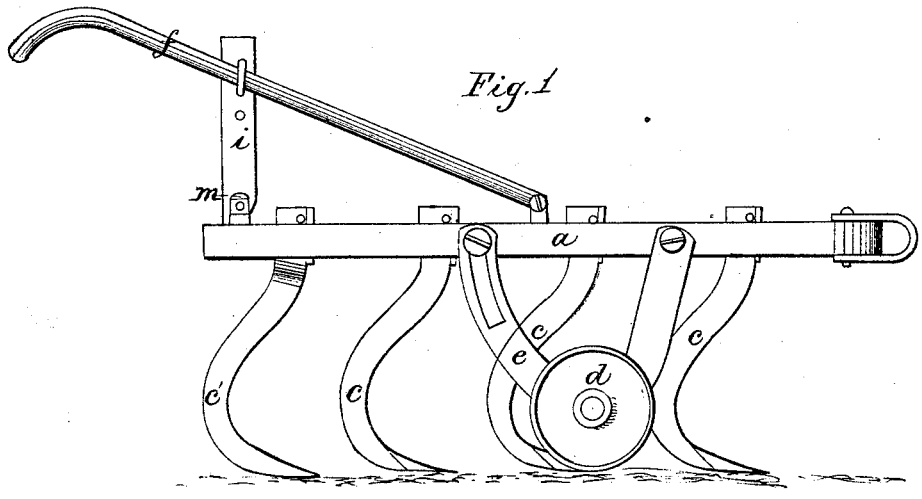
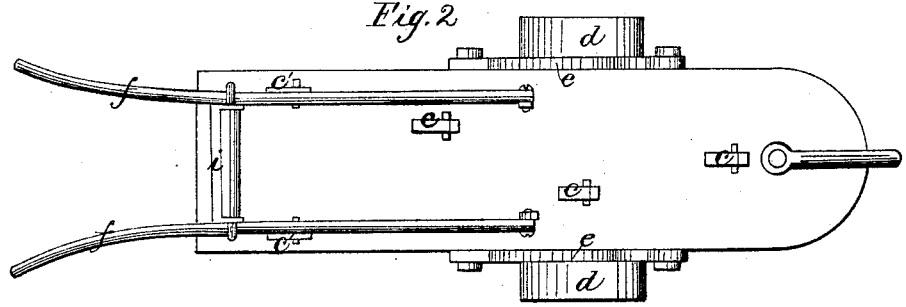
Witnesses
Chas F Brown
W ed Thomas
Inventor
C. Bartholomew
J W Beadle atty.

UNITED STATES PATENT OFFICE.

CALEB BARTHOLOMEW, OF ÆTNA, NEW YORK.

IMPROVEMENT IN DITCHING-MACHINES.

Specification forming part of Letters Patent No. 94,696, dated September 14, 1869.

*To all whom it may concern:*

Be it known that I, C. BARTHOLOMEW, of Ætna, in the county of Tompkins and State of New York, have invented a new and useful Improvement in Ditching-Machines; and I do hereby declare that the following is a full, clear, and exact description of the construction and operation of the same, reference being had to the annexed drawings, making a part of this specification.

My invention is not intended to clean out the ditch, but to prepare the strip of ground intended for the ditch by thoroughly breaking up the earth, so that it may be easily shoveled out.

A is an iron slab or beam, of about the width of an ordinary ditch, and of such thickness as to give a firm support to the teeth, the shanks of which pass directly through it. Projecting from this beam, upon the under side, are the five teeth or plows $c\ c\ c\ c'\ c'$, all of equal length. The two rear teeth, $c'\ c'$, set opposite each other, at the rear end of the beam, while the other three are set forward, partly following each other, so as to cut over, in passing, all the earth or space between the two rear teeth. These rear teeth are flat upon their outer sides, like the landside of a plow, and cut down the sides of the ditch vertically, throwing the earth in toward the center of the ditch; but the three forward teeth are made like the point of a plow, but quite flat, and turning the dirt both ways. The shanks are narrow to pass through the earth, and the points being flat, the dirt is raised but little by their passage.

At the sides of the beam, near its center, are attached the gage-wheels $d\ d$ upon the bent slotted irons $e\ e$. The wheels may be raised or lowered at pleasure and held in position by the set-screws working through the slots. The wheels run upon the surface of the ground upon either side of the proposed ditch and gage its depth, and at the same time prevent the machine from tipping to one side or the other.

A little forward of the center of the beam, upon each side, are hinged the handles $f\ f$. These run back through clamps on the frame or slab $i$. At $m\ m$ this frame is hinged to the beam. By inclining the frame forward or backward the handles are raised or depressed to suit the operator, and by tightening the clamps upon the handles they are retained in the position desired.

The apparatus is drawn by horse or other power, and as it moves forward thoroughly loosens and breaks up a strip of earth equal to the width of the machine, and to a uniform depth, so that all that remains to be done to perfect the ditch is to shovel out the pulverized earth.

What I claim, and desire to secure by Letters Patent, is—

1. The peculiar arrangement of the five teeth, when formed as described—that is, the three forward teeth of the one form and the two rear teeth of the other—for the purpose of cutting the sides of the ditch and breaking up the earth within it.

2. The pivoted handles $f$, pivoted standard $i$, and adjustable bearing-wheels $d$, in combination with the frame A and teeth $c$, when arranged as and for the purpose described.

CALEB BARTHOLOMEW.

Witnesses:
W. MARSH,
G. H. HENTZ.